(12) United States Patent
Sperry et al.

(10) Patent No.: US 11,143,149 B2
(45) Date of Patent: Oct. 12, 2021

(54) COBRA HEAD AIR INTAKE PORTS

(71) Applicant: Cummins Inc., Columbus, IN (US)

(72) Inventors: Robert G. Sperry, Columbus, IN (US); Terry D. Partridge, Columbus, IN (US); Steven L. Leffler, Vincennes, IN (US); Kartikeya Tyagi, Indianapolis, IN (US); Amit A. Kulkarni, Columbus, IN (US); Pallav Jha, Columbus, IN (US)

(73) Assignee: Cummins Inc., Columbus, IN (US)

(*) Notice: Subject to any disclaimer, the term of this patent is extended or adjusted under 35 U.S.C. 154(b) by 0 days.

(21) Appl. No.: 16/329,410

(22) PCT Filed: Aug. 31, 2016

(86) PCT No.: PCT/US2016/049787
§ 371 (c)(1),
(2) Date: Feb. 28, 2019

(87) PCT Pub. No.: WO2018/044308
PCT Pub. Date: Mar. 8, 2018

(65) Prior Publication Data
US 2019/0219010 A1 Jul. 18, 2019

(51) Int. Cl.
*F02M 35/10* (2006.01)
*F02F 1/42* (2006.01)

(52) U.S. Cl.
CPC ..... *F02M 35/10124* (2013.01); *F02F 1/4235* (2013.01); *F02M 35/10111* (2013.01); *F02M 35/10118* (2013.01); *Y02T 10/12* (2013.01)

(58) Field of Classification Search
CPC .............. F02M 35/10118; F02M 35/10111

USPC ............................. 123/184.21, 184.53
See application file for complete search history.

(56) References Cited

U.S. PATENT DOCUMENTS

| 4,577,602 | A | | 3/1986 | Showalter | |
|---|---|---|---|---|---|
| 4,595,319 | A | * | 6/1986 | Cook | F16L 57/06 285/179 |
| 4,693,084 | A | * | 9/1987 | Ahrens | F02B 29/045 123/563 |
| 4,733,889 | A | * | 3/1988 | Haines | F16L 57/06 285/16 |
| 4,787,421 | A | | 11/1988 | Yu | |
| 4,829,944 | A | * | 5/1989 | Sukimoto | F02M 35/10072 123/184.61 |
| 5,054,819 | A | | 10/1991 | Grunwald | |

(Continued)

FOREIGN PATENT DOCUMENTS

| EP | 2281138 A1 | 2/2011 |
|---|---|---|
| WO | 2006033602 A1 | 3/2006 |

(Continued)

OTHER PUBLICATIONS

International Search Report and Written Opinion issued by the ISA/US, Commissioner for Patents, dated Nov. 18, 2016, for International Application No. PCT/US2016/049787; 10 pages.

*Primary Examiner* — Long T Tran
*Assistant Examiner* — James J Kim
(74) *Attorney, Agent, or Firm* — Faegre Drinker Biddle & Reath LLP

(57) ABSTRACT

The present disclosure provides air intake ports and/or intake manifolds having an altered configuration to improve the efficiency of the air intake ports, intake manifolds, and by extension, the engine.

18 Claims, 5 Drawing Sheets

(56) References Cited

U.S. PATENT DOCUMENTS

| | | | |
|---|---|---|---|
| 5,195,488 A | 3/1993 | Rattigan | |
| 5,196,488 A | 3/1993 | Yang et al. | |
| 5,269,650 A * | 12/1993 | Benson | F01N 13/08 |
| | | | 138/109 |
| 5,288,111 A * | 2/1994 | Storf | F16L 43/00 |
| | | | 285/179 |
| 6,065,444 A * | 5/2000 | Jingu | F02B 31/085 |
| | | | 123/301 |
| 6,848,408 B1 | 2/2005 | Mendler | |
| 7,182,057 B2 * | 2/2007 | Sato | F02F 1/4235 |
| | | | 123/193.5 |
| 7,300,074 B1 * | 11/2007 | Paulson | B65G 53/523 |
| | | | 285/179 |
| 8,449,250 B2 * | 5/2013 | Anschel | F02M 35/10144 |
| | | | 415/206 |
| 8,516,986 B2 * | 8/2013 | Silvano | F02M 35/10118 |
| | | | 123/184.53 |
| 8,555,637 B2 * | 10/2013 | Nakae | F02M 35/10144 |
| | | | 60/605.1 |
| 2005/0139195 A1 | 6/2005 | Kuriki et al. | |
| 2009/0026761 A1 | 1/2009 | McMillan | |
| 2010/0229818 A1 * | 9/2010 | Silvano | F02M 35/10118 |
| | | | 123/184.21 |
| 2019/0219010 A1 | 7/2019 | Sperry et al. | |
| 2020/0263642 A1 | 8/2020 | Sperry et al. | |

FOREIGN PATENT DOCUMENTS

| | | | |
|---|---|---|---|
| WO | 0032923 A1 | 6/2006 | |
| WO | WO2009127192 A1 | 10/2009 | |

\* cited by examiner

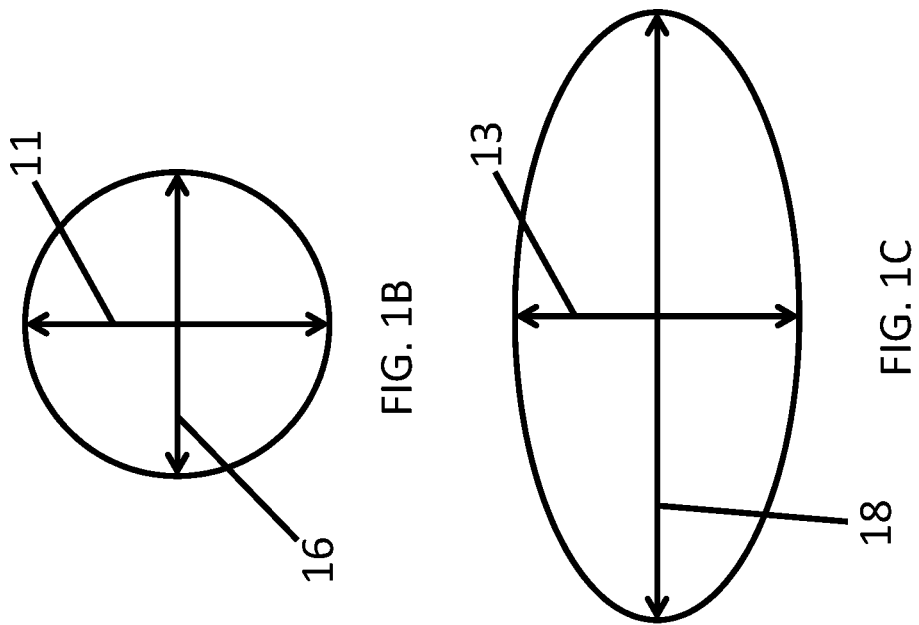
FIG. 1B
FIG. 1C
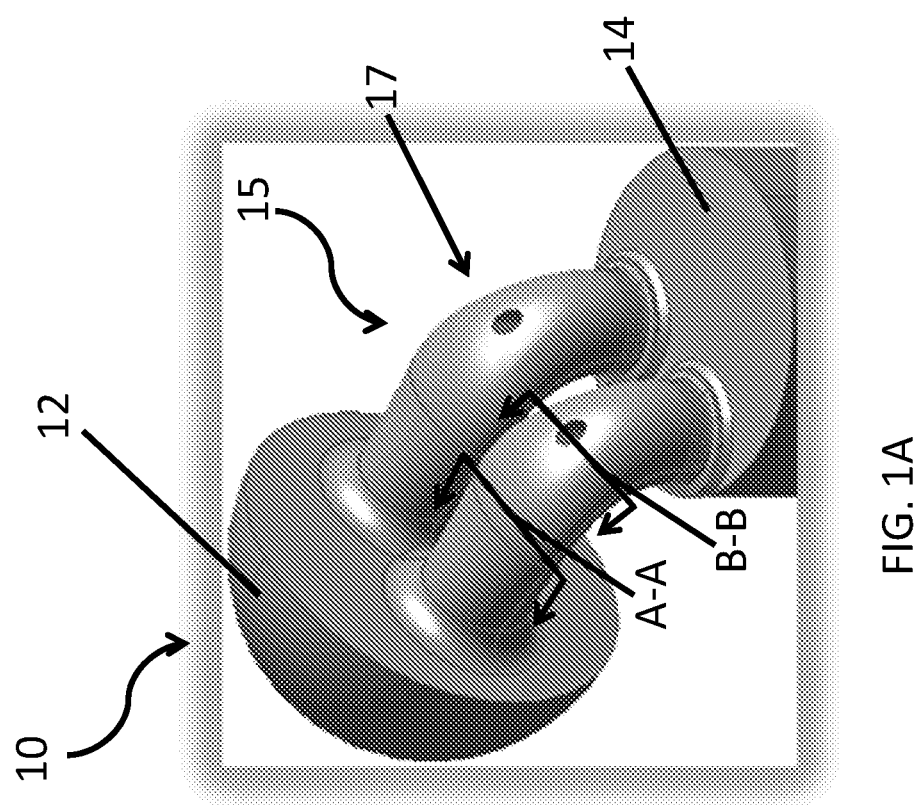
FIG. 1A

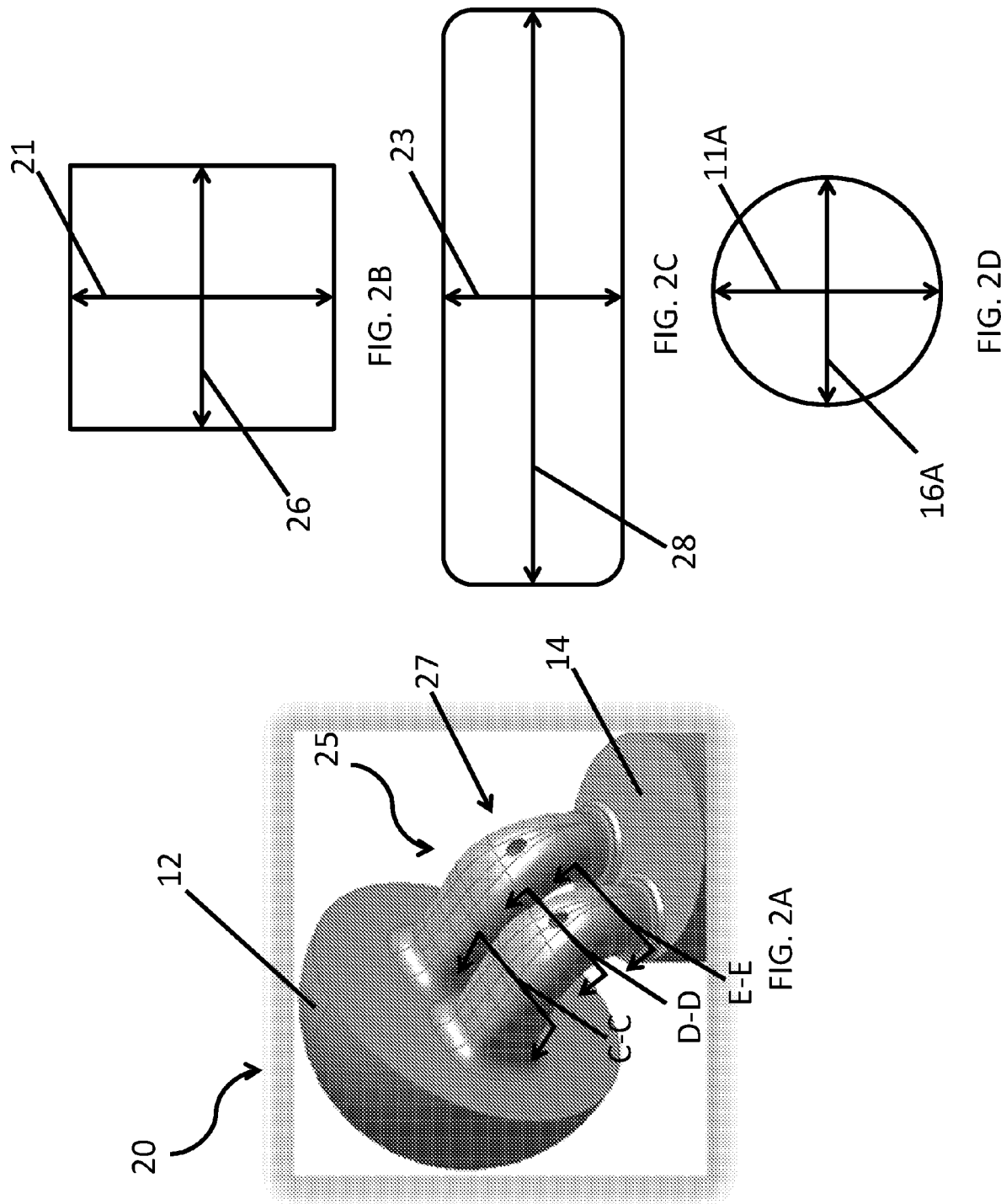

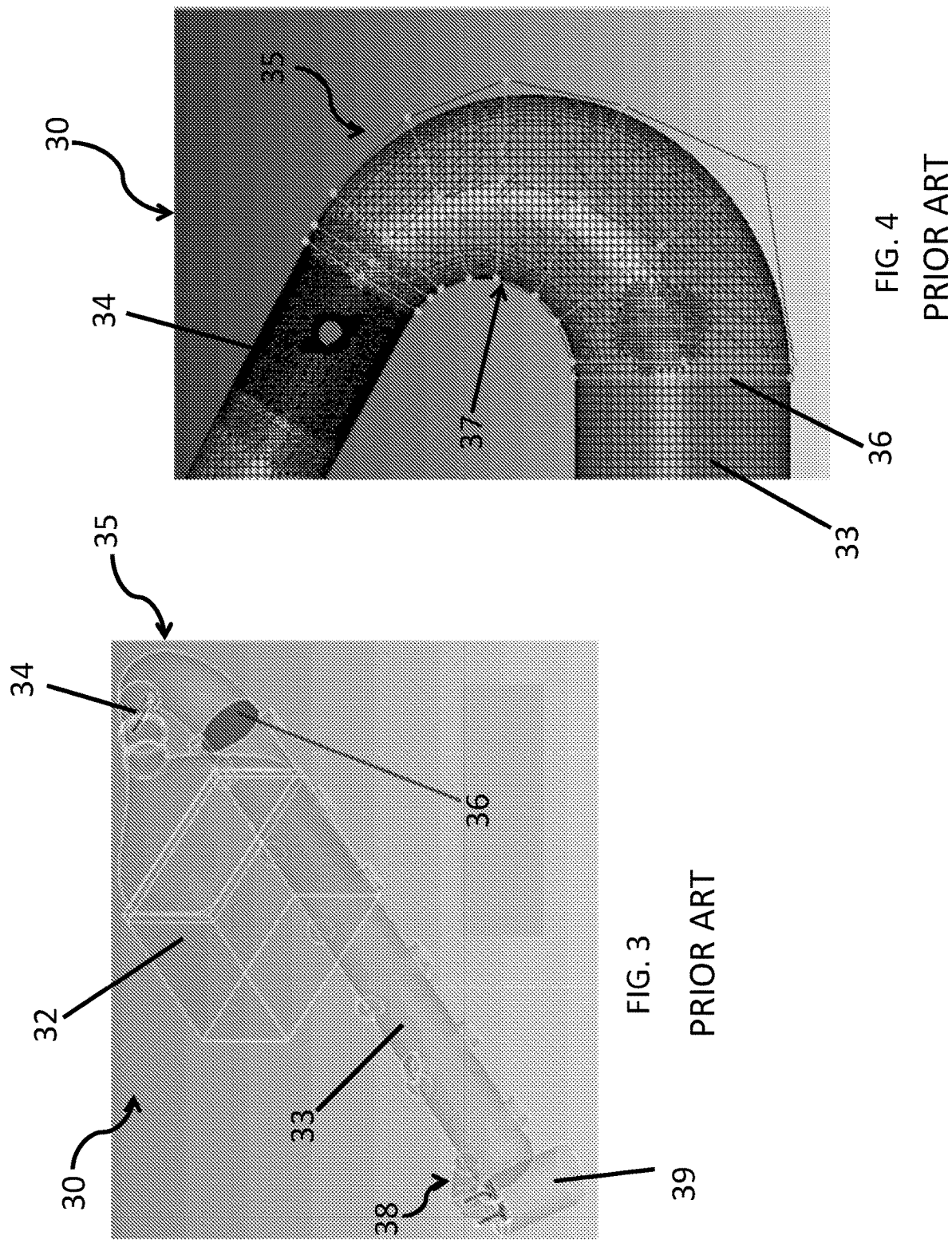

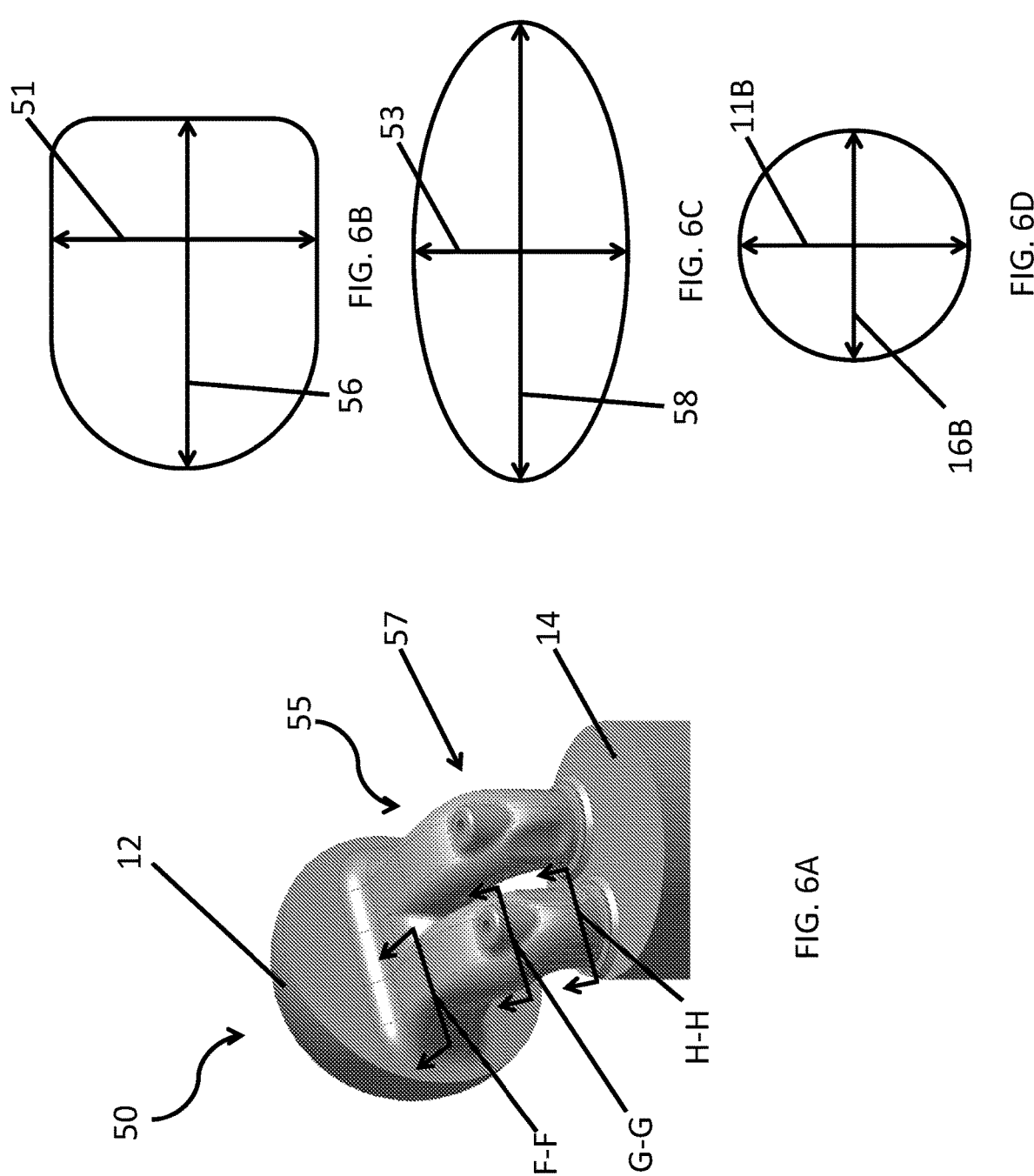

COBRA HEAD AIR INTAKE PORTS

CROSS-REFERENCE TO RELATED APPLICATIONS

This application is a national phase filing of PCT International Application Serial No. PCT/US2016/049787, filed Aug. 31, 2016, the disclosure of which is expressly incorporated herein by reference.

FIELD OF THE DISCLOSURE

The present disclosure generally relates to air intake ports and intake manifolds for internal combustion engines and more particularly, to cobra head air intake ports and cobra head intake manifolds coupled to an air inlet connection with improved efficiency.

BACKGROUND OF THE DISCLOSURE

An internal combustion engine includes an engine body and engine components, such as an engine cylinder, intake manifold, and intake port(s). Air intake into the engine cylinder determines, in part, the efficiency of an engine. One goal for an internal combustion engine as it pertains to air intake is to bring in as much air as possible into the engine cylinder for combustion. One challenge with air intake ports and/or intake manifolds is that they may contain a bend and based on the configuration of the bend, the intake ports and/or intake manifolds may be inefficient at bringing the maximum amount of air into the engine cylinder resulting in engine inefficiencies. Improvements in air intake system efficiency are desired.

Referring to FIGS. 3 and 4, an intake portion 30 of an engine is shown. Intake portion 30 includes cooler 32, throttle valve 34, and an elbow section 35 configured to turn and substantially change the direction of air flow entering the inlet. As air enters cooler 32, air moves through throttle valve 34, which serves to regulate the amount of air entering the engine, elbow section 35 and elbow exit plane 36. Air then further proceeds to intake manifold 33, intake runner 38, and engine cylinder 39.

Elbow section 35 has a transition from throttle valve 34 to elbow exit plane 36 and intake manifold 33 in that both the inner and outer surfaces of bend 37 includes a single continuous turn. Elbow section 35 has a single bend 37 and has an increasing diameter throughout elbow section 35 until it reaches elbow exit plane 36 and couples to intake manifold 33.

SUMMARY OF THE DISCLOSURE

The present disclosure provides air intake ports and/or intake manifolds having an altered configuration to improve the efficiency of the air intake ports, intake manifolds, and by extension, the engine.

According to one embodiment, the present disclosure provides an intake port comprising: a tubular member having an inlet and an outlet, the tubular member having a bend positioned between the inlet and the outlet; the tubular member having a first axis length and a second axis length at portions of the tubular member upstream of the bend; the tubular member having a third axis length and a fourth axis length at the bend; and the tubular member having a fifth axis length and a sixth axis length at portions downstream of the bend; and wherein the third axis length is greater than the first axis length and the second axis length is greater than the fourth axis length.

According to another embodiment, the present disclosure provides an air inlet apparatus comprising: an elbow section having an inlet and an outlet, the outlet coupled to an intake manifold; the elbow section including a bend having a first turn near the inlet and a second turn near the outlet, wherein the first turn and the second turn cooperate to change a direction of air flow through the elbow section; a substantially straight section connecting the first turn and the second turn; a first bulge section adjacent to the first turn; and a second bulge section adjacent to the second turn, wherein the first bulge section and the second bulge section are configured to maintain flow uniformity and reduce pressure drop of the air flow.

According to another embodiment, the present disclosure provides an air intake apparatus comprising: a tubular member having an inlet and an outlet, the tubular member having a bend positioned between the inlet and the outlet; the tubular member having a first axis length and a second axis length at portions of the tubular member upstream of the bend; the tubular member having a third axis length and a fourth axis length at the bend; the tubular member having a fifth axis length and a sixth axis length at portions downstream of the bend; wherein the third axis length is greater than the first axis length and the second axis length is greater than the fourth axis length; the tubular member has a first cross-sectional area at a location upstream or downstream of the bend, and a second cross-sectional area at the bend that is substantially equal to the first cross-sectional area; an elbow section having an inlet and an outlet, the outlet of the elbow section coupled to an intake manifold; the elbow section including a bend having a first turn near the inlet of the elbow section and a second turn near the outlet of the elbow section, wherein the first turn and the second turn cooperate to change a direction of air flow through the elbow section; a substantially straight section connecting the first turn and the second turn; a first bulge section adjacent to the first turn; and a second bulge section adjacent to the second turn, wherein the first bulge section and the second bulge section are configured to maintain flow uniformity and reduce pressure drop of the air flow.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein:

FIG. 1A is a perspective view of an air intake port according to an embodiment of the present disclosure;

FIG. 1B is a cross-sectional view of the air intake port of FIG. 1A taken along line A-A for both before and after a bend in the air intake port;

FIG. 1C is a cross-sectional view of the air intake port of FIG. 1A taken along line B-B at the bend of the air intake port;

FIG. 2A is a perspective view of an alternate embodiment of an air intake port according to the present disclosure;

FIG. 2B is a cross-sectional view of the air intake port of FIG. 2A taken along line C-C before a bend in the air intake port;

FIG. 2C is a cross-sectional view of the air intake port of FIG. 2A taken along line D-D at the bend of the air intake port;

FIG. 2D is a cross-sectional view of the air intake port of FIG. 2A taken along line E-E after the bend of the air intake port;

FIG. 3 is a perspective view of an air intake apparatus of an internal combustion engine according to an embodiment of the present disclosure;

FIG. 4 is a side view of a portion of an elbow of the air intake apparatus of FIG. 3;

FIG. 6A is a perspective view of an alternate embodiment of an air intake port according to the present disclosure;

FIG. 6B is a cross-section view of the air intake port of FIG. 6A take along line F-F before a bend in the air intake port;

FIG. 6C is a cross-sectional view of the air intake port of FIG. 6A taken along line G-G at the bend of the air intake port; and FIG. 6D is a cross-sectional view of the air intake port of FIG. 6A taken along line H-H after the bend of the air intake port.

DETAILED DESCRIPTION OF EMBODIMENTS

Figure 5C:
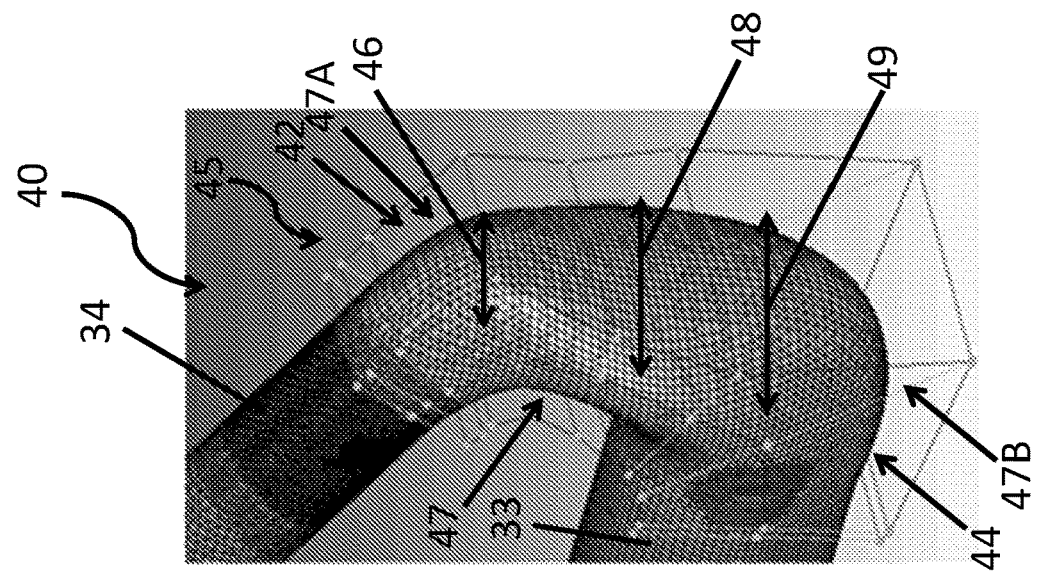
FIG. 5C is a perspective view of the elbow of FIG. 5A.

The embodiments disclosed herein are not intended to be exhaustive or to limit the disclosure to the precise forms disclosed in the following detailed description. Rather, the embodiments were chosen and described so that others skilled in the art may utilize their teachings.

Referring initially to FIGS. 1A-1C, an intake portion 10 of an engine is shown. Intake portion 10 includes intake ports 15 which are coupled to intake manifold 12 and engine cylinder 14. In the illustrated embodiment, intake port 15 includes a bend 17 between intake manifold 12 and engine cylinder 14. During operation of the engine, air moves from intake manifold 12, through intake ports 15, through bend 17, and into engine cylinder 14. The air is then routed out of engine cylinder 14 as exhaust after combustion.

In the illustrated embodiment, intake port 15 between intake manifold 12 and bend 17 has a circular cross-section as shown in FIG. 1B. The fixed diameter of the circular cross-section can be viewed as including a first axis of symmetry having an axis length 16 and a second axis of symmetry having an axis length 11. At bend 17, intake port 15 has a cross-sectional area of an ellipse or ovoid with a first axis of symmetry (i.e., the major axis) having an axis length 18 (FIG. 1C), which is larger than first axis length 16, and a second axis of symmetry (i.e., the minor axis) having an axis length 13 (FIG. 1C), which is smaller than second axis length 11. Between bend 17 and cylinder 14, intake port 15 returns to its circular cross-section with a first axis length and a second axis length that are substantially equal to axis lengths 16, 11 of FIG. 1B. In an alternate embodiment, the axis lengths of intake port 15 upstream and downstream of bend 17 are not substantially equal to each other.

While the axis lengths of intake port 15 change at certain points of intake port 15, the cross-sectional area throughout intake port 15 either remains substantially constant or slightly decreases as intake port 15 extends to engine cylinder 14. To maintain the cross-sectional area throughout intake port 15, the first axis length of intake port 15 varies in an inverse relationship with the second axis length of intake port 15—as the first axis length of intake port 15 increases, there is a reduction of the second axis length. At bend 17, intake port 15 has a second axis length 13 which is smaller than second axis length 11 (FIG. 1B) positioned at other portions of intake port 15 that are either upstream or downstream of bend 17. The variations in axis lengths of intake port 15 result in an intake port 15 that forms a "cobra-head" shape at bend 17.

As air is brought into the system during operation, air moves along the path of least resistance. In the case of an intake port with a bend, air wants to move through the intake port immediately adjacent to the inner or lower surface of the bend because it is the shortest path to the engine cylinder, i.e., the path of least resistance.

As explained above, with the "cobra head" configuration as described in FIGS. 1A-1C, the increased first axis length 18 and reduced second axis length 13 at bend 17 result in an elliptical cross-section as compared to a circular cross-section which exists upstream and downstream of bend 17. By having an elliptical cross-section instead of a circular cross-section, the lower surface of bend 17 is laterally extended; thereby, increasing the surface area immediately adjacent to the lower surface of bend 17. With the increased surface area at this location, a greater amount of air can move through intake port 15 immediately adjacent to the lower surface of bend 17. Additionally, because the second axis length 13 of intake port 15 is smaller at bend 17 (to maintain a constant cross-sectional area through intake port 15), a greater portion of the cross-sectional area of intake port 15 is closer to the lower surface of bend 17. This permits a greater amount of air per unit area to move through intake port 15 adjacent to the lower surface of bend 17 with a lower pressure loss when compared with upper portions of an intake port with a circular cross-section at bend 17. By having more air move through intake port 15 and into cylinder 14, a more efficient air intake port 15 is provided.

Referring now to FIGS. 2A-2D, an alternate embodiment of an intake portion 20 is shown. Intake portion 20 includes intake ports 25 which are coupled to intake manifold 12 and engine cylinder 14. Like intake port 15, intake port 25 includes a bend 17 between intake manifold 12 and engine cylinder 14.

In the illustrated embodiment, between intake manifold 12 and bend 17, intake port 25 has a square cross-section with a first axis length 26 and an equal, second axis length 21 as shown in FIG. 2B. At bend 17, intake port 25 has a substantially rectangular cross-section with a first axis length 28 (FIG. 2C), which is larger than first axis length 26 of the square cross-section portion of intake port 25, and a second axis length 23, which is smaller than second axis length 21. In the illustrated embodiment, the rectangular cross section of intake port 25 has rounded corners. Between bend 17 and cylinder 14, intake port 25 returns to a circular cross-section as shown in FIG. 2D with a first axis length 16A, which is smaller than first axis length 28, and a second axis length 11A, which is larger than second axis length 23. In one exemplary embodiment, axis lengths 16A, 11A are substantially equal to axis lengths 16, 11 of FIG. 1B. In an alternate embodiment, the axis lengths of intake port 25 upstream and downstream of bend 17 are substantially equal to each other. In a further alternate embodiment, the axis lengths of intake port 25 upstream and downstream of bend 17 are not substantially equal to each other.

While the axis lengths of intake port 25 changes at certain points of intake port 25, the cross-sectional area throughout intake port 25 either remains substantially constant or slightly decreases as intake port 25 extends to engine cylinder 14. To maintain the cross-sectional area throughout intake port 25, the first axis length of intake port 25 varies in an inverse relationship with the second axis length of intake port 25—as the first axis length of intake port 25 increases, there is a reduction of the second axis length. At bend 17, intake port 25 has a second axis length 23 which is smaller than second axis length 21 (FIG. 2A) and second axis length 11A (FIG. 2D), which are located at portions of intake port 25 that are either upstream or downstream of bend 17. The variations in axis lengths of intake port 25 result in a rectangular "cobra-head" shaped intake port 25 at bend 17.

As mentioned earlier, as air is brought into the system during operation, air wants to move along the path of least resistance. In the case of an intake port with a bend, air wants to move through the intake port adjacent to the inner or lower surface of the bend because it is the shortest path to the engine cylinder, i.e., the path of least resistance. With the "rectangular cobra head" configuration as described in FIGS. 2, 2A, and 2B, the increased first axis length 28 and reduced second axis length 23 at bend 17 result in a substantially rectangular cross-section as compared to a square and circular cross-section which exists upstream and downstream of bend 17, respectively. By having a rectangular cross-section instead of a square cross-section, the lower surface of bend 17 is extended; thereby, increasing the surface area adjacent to the lower surface of bend 17. With the increased surface area at this location, a greater amount of air can move through intake port 25 adjacent to the lower surface of bend 17. Additionally, because the second axis length 23 of intake port 25 is lower at bend 17 (to maintain a constant cross-sectional area through intake port 25), a greater portion of the cross-sectional area of intake port 25 is closer to the lower surface of bend 17. This permits a greater amount of air per unit area to be closer to bend 17 and move through intake port 25 adjacent to the lower surface of bend 17 without experiencing a larger pressure loss as occurs with upper portions of an intake port with a square cross-section at bend 17. By having more air move through intake port 25 and into cylinder 14, a more efficient air intake port 15 is provided.

Another feature of the cobra-head configuration of FIGS. 1A-1C and 2A-2D is that the intake ports 15, 25 are flexible in design. Intake ports 15 and 25 are able to wrap around other parts of the engine if needed due to spatial limitations without sacrificing performance and maintaining cross-sectional area. For example, an intake port 55 with a cross sectional area as shown in FIGS. 6A-6D may be necessary when spatial limitations exist within the engine. Intake port 55, which is coupled to intake manifold 12 and engine cylinder 14, has a non-symmetrical cross-sectional area (with axis length 56 and axis length 51) upstream of bend 57 as shown in FIG. 6B while having an elliptical cross-section (with axis length 58 and axis length 53) at bend 57 and a circular cross-section (with axis length 16B and axis length 11B) similar to intake ports 15 and 25) downstream of bend 57. Like intake ports 15 and 25, intake port 55 substantially maintains its cross-sectional area throughout the entirety of intake port 55; thereby, still reaping the benefits of the configurations of intake ports 15 and 25.

Figure 5B:
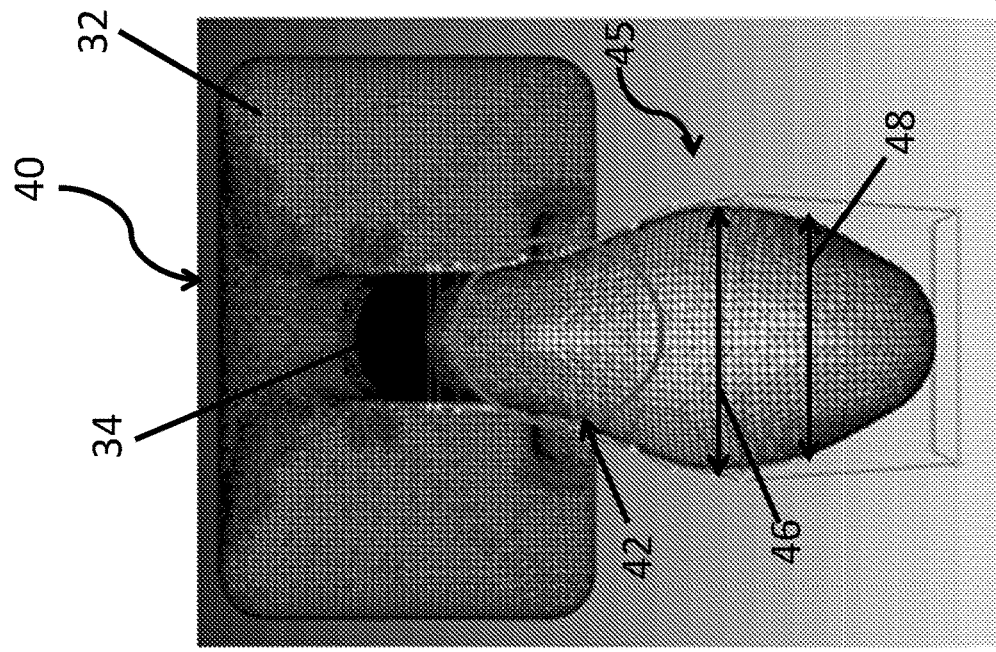
FIG. 5B is a rear view of the elbow of FIG. 5A.
Figure 5A:
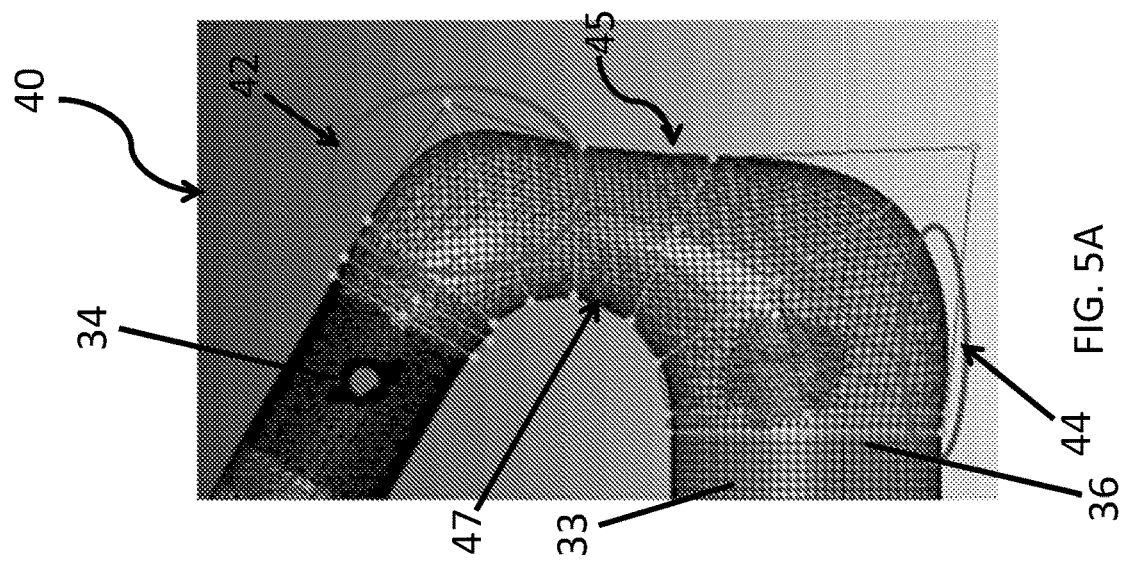
FIG. 5A is a side view of an alternate embodiment of an elbow of the air intake apparatus of FIG. 3 according to the present disclosure.

Referring now to FIGS. 5A-5C, an elbow section 45 for an intake portion 40 of an engine is shown. Intake portion 40 includes cooler 32, throttle valve 34, elbow exit plane 36, and intake manifold 33. In one exemplary embodiment, elbow section 45 is coupled to intake manifold 33. In an alternate embodiment, elbow section 45 is integrally formed with intake manifold 33.

Elbow section 45 is configured to turn and substantially change the direction of air flow entering from cooler 32 while maintaining flow uniformity and reducing fluid pressure drop through elbow exit plane 36. Elbow section 45 includes a bend 47, and elbow section 45 includes a "cobra head" configuration along an outer surface of bend 47, similar to what is shown in FIGS. 1A-1C and 2A-2D. Additionally, the outer surface of bend 47 includes two distinct turns 47A, 47B with a substantially straight section therebetween due to the cobra-head like configuration and bulges, as described in further detail below.

As air moves from throttle valve 34 towards intake manifold 33, air moves through elbow section 45. In the illustrated embodiment, at first turn 47A, elbow section 45 has a substantially circular cross-section with a first axis length 46. As air moves to a substantially straight portion of bend 47 of elbow section 45, elbow section 45 has a substantially elliptical cross-sectional area with a first axis length 48, which is larger than first axis length 46. As air moves into second turn 47B, the cross-sectional area of elbow section 45 returns to a circle with a first axis length 49, which is larger than first axis length 46. In an alternate embodiment, the axis lengths of elbow section 45 upstream and downstream of bend 47 are substantially equal to each other. After second turn 47B, air moves through exit plane 36 and into intake manifold 33.

While the first axis lengths of elbow section 45 change at certain points along the substantially straight portion of elbow section 45, the second axis lengths (not shown), which span the distance between the inner and outer surfaces of bend 47, along bend 47 either remain substantially constant or become slightly smaller along the substantially straight portion of elbow section 45. The variations in axis lengths of elbow section 45 result in a "cobra head" shaped elbow section 45 at the substantially straight portion of bend 47.

As mentioned earlier, with respect to FIGS. 1A-1C and 2A-2D, the "cobra head" configuration increases the surface area adjacent to the lower surface of bend 47 so that a greater amount of air can move through elbow section 45 adjacent to bend 47. Also, since the height of elbow section 45 is constant or reduced at bend 47, a greater portion of the cross-sectional area of elbow section 45 is closer to the lower surface of bend 47. This allows a greater amount of air per unit area to move through elbow 45 adjacent to bend 47 without experiencing a pressure loss that would occur if the height is increased at bend 47. By having more air move through elbow section 45 and into intake manifold 33, a more efficient elbow is provided.

Elbow section 45 also includes an upper bulge 42 positioned substantially adjacent throttle valve 34 and a lower bulge 44 positioned adjacent elbow exit plane 36 and intake manifold 33. In an alternate embodiment, only an upper bulge 42 may be used. In a further alternate embodiment, only a lower bulge 44 may be used.

Upper bulge 42 and lower bulge 44 are strategically placed where a majority of air flow is turned within elbow section 45—at turns 47A, 47B. The bulges 42, 44 provide an increase in area within elbow section 45 and serve to reduce the speed of air flow through turns 47A, 47B. The reduction in air flow speed allows the air to move through turns 47A, 47B without experiencing a large pressure loss, which improves flow uniformity.

As mentioned earlier, elbow section 45 is configured to turn and substantially change the direction of air flow entering from cooler 32 while improving flow uniformity and reducing fluid pressure drop through turns 47A and 47B. Due to the presence of throttle valve 34 upstream of elbow section 45, there are two distinct regions of high velocity flow streams—one following first turn 47A and the other following the substantially straight section leading into second turn 47B. The high velocity regions contribute to a non-uniform flow distribution at exit plane 36. Elbow section 45 mitigates the high velocity flow of air after turn 47A and after the substantially straight section of elbow section 45 by expanding the second axis lengths at first turn 47A and second turn 47B. By diffusing high velocity flow through elbow section 45, flow uniformity is improved.

Elbow section 45 substantially changes the direction of the inlet flow of air with a lower pressure loss and better flow distribution. The combination of second axis length expansion at turns 47A, 47B and the strategic placement of bulges 42, 44 at turns 47A, 47B, respectively, result in a higher flow uniformity for inlet air flow. An improvement in flow uniformity reduces the recirculation of charge in the log, which in turn, helps with lowering both pressure drop and cylinder-to-cylinder variation of the non-dimensional swirl number. It also helps reduce the cylinder-to-cylinder combustion variance overall and promotes even breathing of the downstream engine cylinders.

Flow uniformity varies between 0 and 1. A flow uniformity value of 0 at exit plane 36 means that all the flow is moving away from exit plane 36 while a flow uniformity value of 1 at exit plane 36 means that all the flow is moving through exit plane 36 and normal to exit plane 36 in the direction of intake manifold 33. Additionally, with a flow uniformity value of 1, the flow at any point on plane 36 has the same velocity. In one exemplary embodiment, the average flow uniformity of intake portion 40 with upper bulge 42 and lower bulge 44 is 0.864 and the pressure drop is 17.28 kPa.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

The invention claimed is:

1. An intake system comprising:
an intake port having an inlet portion, an outlet portion, and a single bend portion positioned between the inlet portion and an outlet portion;
an intake manifold coupled to the inlet portion of the intake port; and
an engine having an engine cylinder, wherein the outlet portion is coupled to the engine so that the intake port is in communication with the engine cylinder;
wherein:
the inlet portion of the intake port has a first axis length and a second axis length;
the bend portion of the intake port has a third axis and a fourth axis length;
the outlet portion of the intake port has a fifth axis length and a sixth axis length at portions downstream of the bend; and
the third axis length is greater than the first axis length and the second axis length is greater than the fourth axis length.

2. The intake system assembly of claim 1, wherein the intake port has a first cross-sectional area at the inlet portion or the outlet portion, and a second cross-sectional area at the bend portion that is substantially equal to the first cross-sectional area.

3. The intake system of claim 2, wherein the first cross-sectional area is a circle and the second cross-sectional area is substantially elliptical.

4. The intake system of claim 3, further comprising a third cross-sectional area at the other of the inlet portion or the outlet portion, wherein the third cross-sectional area is substantially equal to the first cross-sectional area and the second cross-sectional area.

5. The intake system of claim 4, wherein the third cross-sectional area is a circle.

6. The intake system of claim 2, wherein the first cross-sectional area is a square and the second cross-sectional area is substantially rectangular.

7. The intake system of claim 6, further comprising a third cross-sectional area at the other of the inlet portion or the outlet portion, wherein the third cross-sectional area is substantially equal to the first cross-sectional area and the second cross-sectional area.

8. The intake system of claim 7, wherein the third cross-sectional area is a circle.

9. An air inlet assembly comprising:
an elbow section having an inlet portion, an outlet portion, and a bend portion positioned between the inlet portion and the outlet portion;
a cooler coupled to the inlet portion of the elbow section via a throttle valve;
an intake manifold coupled to the outlet portion of the elbow section so that the elbow section is in communication with an engine cylinder; and
the bend portion having a first turn near the inlet portion and a second turn near the outlet portion, wherein the first turn and the second turn cooperate to change a direction of air flow through the elbow section;
a substantially straight section directly connecting the first turn and the second turn so that the first turn, the second turn, and the substantially straight section are substantially planar;
a first bulge section adjacent to the first turn; and
a second bulge section adjacent to the second turn, wherein the first bulge section and the second bulge section are configured to maintain flow uniformity and reduce pressure drop of the air flow.

10. The assembly of claim 9, wherein the first turn and the second turn cooperate to change the direction of the air flow by approximately 180 degrees.

11. The assembly of claim 9, wherein the elbow section further includes:
a first axis length and a second axis length at the first turn;
a third axis length and a fourth axis length at the bend; and
a fifth axis length and a sixth axis length at the second turn;
wherein the first axis length and the fifth axis length are less than the third axis length and the second axis length and the sixth axis length are greater than the fourth axis length.

12. The assembly of claim 9, further comprising an air inlet and a throttle coupled to the inlet portion.

13. An air intake assembly comprising:
an elbow section having an inlet portion, an outlet portion, and a bend portion positioned between the inlet portion and an outlet portion;
a cooler coupled to the inlet portion of the elbow section via a throttle valve;
an intake manifold coupled to the outlet portion of the elbow section so that the elbow section is in communication with an engine cylinder; and
wherein the elbow section has:
- a first axis length and a second axis length at portions upstream of the bend portion;
- a third axis length and a fourth axis length at the bend portion; and
- a fifth axis length and a sixth axis length at portions downstream of the bend portion; and wherein the third axis length is greater than the first axis length and the second axis length is greater than the fourth axis length;
the elbow section has a first cross-sectional area at a location upstream or downstream of the bend portion, and a second cross-sectional area at the bend portion that is substantially equal to the first cross-sectional area; and
wherein the bend portion has:
- a first turn near the inlet portion and a second turn near the outlet portion, wherein the first turn and the second turn cooperate to change a direction of air flow through the bend portion;
- a substantially straight section directly connecting the first turn and the second turn so that the first turn, the second turn, and the substantially straight section are substantially planar;
- a first bulge section adjacent to the first turn; and
- a second bulge section adjacent to the second turn, wherein the first bulge section and the second bulge section are configured to maintain flow uniformity and reduce pressure drop of the air flow.

14. The apparatus of claim 13, further comprising a third cross-sectional area downstream of the bend portion, wherein the third cross-sectional area is substantially equal to the first cross-sectional area and the second cross-sectional area.

15. The apparatus of claim 14, wherein the first cross-sectional area is a circle and the second cross-sectional area is substantially elliptical.

16. The apparatus of claim 15, wherein the third cross-sectional area is a circle.

17. The apparatus of claim 13, the first cross-sectional area is a square and the second cross-sectional area is substantially rectangular.

18. The apparatus of claim 17, wherein the third cross-sectional area is a circle.

* * * * *